UNITED STATES PATENT OFFICE.

GEORGE F. J. COLBURN, OF NEWARK, NEW JERSEY, ASSIGNOR TO WILLIAM M. WELLING.

IMPROVEMENT IN COMPOSITIONS OF MATTER.

Specification forming part of Letters Patent No. 73,694, dated January 28, 1868; reissue No. 5,596, dated October 14, 1873; application filed August 22, 1873.

*To all whom it may concern:*

Be it known that I, GEORGE F. J. COLBURN, of Newark, in the county of Essex and State of New Jersey, have invented a new and valuable Compound of Matter; and I do hereby declare that the following is a specification of the same.

In Letters Patent No. 67,025, granted to me, a composition of matter is described. My present invention is an improvement on the same. I have discovered that the proportion of asbestus to shellac may be largely increased, and that the composition is available for many purposes in the arts. This compound may be molded or otherwise formed into a variety of articles, such as buttons, handles for knives, canes, and umbrellas, door-knobs, boxes, &c.; in short, answering nearly every purpose to which vulcanite or hard rubber is applied, at a much less expense. I make use of asbestus and shellac in nearly equal proportions. The asbestus renders the composition strong and lessens the frangibility of the shellac. At the same time the composition is rendered capable of resisting a higher temperature without softening or melting. This compound may be colored with any variety of coloring, as sulphur, oxide of zinc, vermilion, or variegated with any kind of bronzes, as taste may indicate.

My mode of preparing and using this compound is stated thus: The shellac and powdered asbestus are thoroughly mixed, either by grinding or otherwise. To this mixture is added whatever is needed to give the desirable coloring, &c. When properly mixed, the whole is warmed in a suitable vessel and stirred until the ingredients are thoroughly incorporated. In this state it is molded or otherwise formed into any required shape for use, and when cool becomes very hard and tenacious.

This compound is also valuable as a cement for coating or uniting various substances, as it has a marked cohesive property, by which it unites with metal or other substances, and the union becomes very strong. It may be used for uniting aluminium. The shank of a door-knob thrust into it when heated becomes sufficiently united to it when cool without any other fastening. In the same way it may be applied for knife-handles, &c. Buttons may be made with a back of metal, and the front of this compound. The two parts are held firmly together simply by the adhesion of the latter.

I claim as my invention—

A composition of shellac and asbestus, in about the proportions and substantially as set forth.

Signed by me this 18th day of August, A. D. 1873.

G. F. J. COLBURN.

Witnesses:

J. F. WOLLARD,

W. H. RACE.